(12) United States Patent
Uzelac et al.

(10) Patent No.: US 10,764,075 B2
(45) Date of Patent: Sep. 1, 2020

(54) REAL TIME APPLICATION PROGRAMMING INTERFACE IN A TELECOMMUNICATIONS NETWORK

(71) Applicant: Level 3 Communications, LLC, Broomfield, CO (US)

(72) Inventors: Adam Charles Uzelac, Rochester, NY (US); Joshua Scott Berlin, Wheat Ridge, CO (US); Michael Dana Chan, Canton, MI (US); Darren James Behmlander, White Lake, MI (US); Gregory Thomas Ellison, Erie, CO (US); Duane Green, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 1337 days.

(21) Appl. No.: 14/244,537

(22) Filed: Apr. 3, 2014

(65) Prior Publication Data
US 2014/0301250 A1 Oct. 9, 2014

Related U.S. Application Data

(60) Provisional application No. 61/807,867, filed on Apr. 3, 2013.

(51) Int. Cl.
*H04L 12/18* (2006.01)
*H04L 29/06* (2006.01)

(52) U.S. Cl.
CPC ...... *H04L 12/1822* (2013.01); *H04L 12/1818* (2013.01); *H04L 65/4038* (2013.01)

(58) Field of Classification Search
CPC ............ H04L 12/1822; H04L 12/1818; H04L 65/4038
See application file for complete search history.

(56) References Cited

U.S. PATENT DOCUMENTS 6,584,076 B1   6/2003  Aravamudan et al.
7,181,141 B1 *  2/2007  Kapur ................. H04L 43/0811
                                                    398/57

(Continued)

OTHER PUBLICATIONS

International Preliminary Report on Patentability, dated Oct. 6, 2015, Int'l Appl. No. PCT/US14/032847, Int'l Filing Date Apr. 3, 2014; 11 pgs.

(Continued)

*Primary Examiner* — Noel R Beharry
*Assistant Examiner* — Wilfred Thomas

(57) ABSTRACT

Aspects of the present disclosure involve systems, methods, computer program products, and the like, for implementing providing a web conferencing service. In one example, the system and methods involve a real-time application programming interface (RTAPI) component in the telecommunications network. The RTAPI is configured, in one embodiment, to provide a platform through which one or more users of the telecommunications network interfaces with one or more conferencing components of the network. In one example, the RTAPI may be configured to coordinate a dial-out to a participant of a conference at a designated time such that the participant is entered into the conference automatically.

20 Claims, 4 Drawing Sheets

(56) References Cited

U.S. PATENT DOCUMENTS

| | | | |
|---|---|---|---|
| 7,328,239 B1* | 2/2008 | Berberian | H04M 3/42221 370/260 |
| 7,353,252 B1* | 4/2008 | Yang | G06Q 10/10 709/204 |
| 2002/0078150 A1 | 6/2002 | Thompson et al. | |
| 2003/0023672 A1* | 1/2003 | Vaysman | H04L 12/1827 709/203 |
| 2003/0035381 A1 | 2/2003 | Chen et al. | |
| 2004/0010549 A1 | 1/2004 | Matus et al. | |
| 2004/0190700 A1* | 9/2004 | Cutaia | H04M 3/42221 379/202.01 |
| 2004/0239754 A1 | 12/2004 | Shachar et al. | |
| 2005/0076108 A1 | 4/2005 | Li et al. | |
| 2005/0213724 A1* | 9/2005 | O'Brien | H04M 3/56 379/202.01 |
| 2006/0146737 A1* | 7/2006 | Ohrstrom Sandgren | H04M 3/56 370/261 |
| 2007/0217589 A1 | 9/2007 | Martin et al. | |
| 2008/0101577 A1* | 5/2008 | Frankel | H04M 3/56 379/202.01 |
| 2010/0149302 A1 | 6/2010 | Malik | |
| 2010/0274796 A1* | 10/2010 | Beauregard | H04L 12/1822 707/769 |
| 2011/0270663 A1* | 11/2011 | Jones | G06Q 30/0231 705/14.31 |
| 2012/0082066 A1 | 4/2012 | O'Sullivan et al. | |
| 2012/0296964 A1* | 11/2012 | Chaturvedi | H04M 3/562 709/204 |

OTHER PUBLICATIONS

International Search Report, dated Sep. 5, 2014, Int'l Appl. No. PCT/US14/032847, Int'l Filing Dated Apr. 3, 2014; 3 pgs.
Written Opinion of the International Search Authority, dated Sep. 5, 2014, Int'l. Appl. No. PCT/US14/032847, Int'l Filing Date Apr. 3, 2014; 9 pgs.
Extended European Search Report, dated Nov. 16, 2016, Application No. 14780045.2, filed Apr. 3, 2014; 6 pgs.
European Examination Report, dated Mar. 5, 2018, Application No. 14780045.2, filed Apr. 3, 2014; 5 pgs.

* cited by examiner

REAL TIME APPLICATION PROGRAMMING INTERFACE IN A TELECOMMUNICATIONS NETWORK

CROSS-REFERENCE TO RELATED APPLICATIONS

This application claims priority under 35 U.S.C. § 119(e) to U.S. Provisional Application No. 61/807,867 entitled "REAL TIME APPLICATION PROGRAMMING INTERFACE IN A TELECOMMUNICATIONS NETWORK", filed on Apr. 3, 2013 which is incorporated by reference in its entirety herein.

TECHNICAL FIELD

Aspects of the present invention generally relate to systems and methods for implementing a telecommunications network, and more specifically for providing a real time application programming interface device in the network to interface one or more users with one or more services of the network, such as collaboration conferencing systems.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from a few users to several thousand users communicating on the same telephonic and/or data call.

Typically, conferencing communications require participants to the conference to place a telephonic call to a dedicated conferencing number. Some networks also require the participants to enter a conference call code into the keypad of a telephonic device. The conferencing number and code are then utilized by the telecommunications network to connect that participant to a conferencing bridge device. In general, a conferencing bridge is a telecommunications device that hosts the participants of a conferencing communication such that the participants can attend the communication. Thus, the network typically receives the dialed number and conference code from each participant and connects the participant to the conferencing bridge. Once connected to the conference bridge, the participant may take part in the conferencing communication.

It is with these and other issues in mind that various aspects of the present disclosure were developed.

SUMMARY

One implementation of the present disclosure may take the form of a method for facilitating a collaboration conference in a telecommunications network. The method includes the operations of receiving a collaboration conference access request from a client application program executed on a client device at an application programming interface of a server associated with the telecommunications network and selecting a hosting conference bridge from a plurality of conference bridges associated with the telecommunications network and configured to host a collaboration conference, the selection occurring in response to the collaboration conference access request. Further, the operations of the method include translating the received collaboration conference access request to one or more instructions specific to the selected hosting conferencing bridge and transmitting the one or more instructions specific to the selected hosting conferencing bridge to the selected hosting conferencing bridge, wherein the one or more instructions specific to the selected hosting conferencing bridge include an indication of the collaboration conference access request from the client application program.

Another implementation of the present disclosure may take the form of a system for hosting a collaboration conference in a telecommunications network. The system include a network interface configured to receive a communication from a user of a communications network to establish a collaboration conference on the network, a processing device in communication with the network interface unit and a computer-readable medium connected to the processing device configured to store information and instructions. The instructions, when executed by the processing device, instantiates an application programming interface that performs several operations. Such operations include receiving a collaboration conference access request from a client application program associated with the user, selecting a hosting conference bridge from a plurality of conference bridges associated with the network and configured to host a collaboration conference, the selection occurring in response to the collaboration conference access request received from the client application program associated with the user, translating the received collaboration conference access request to one or more instructions specific to the selected hosting conferencing bridge and transmitting the one or more instructions specific to the selected hosting conferencing bridge to the selected hosting conferencing bridge.

Yet another implementation of the present disclosure takes the form of a networking component of a telecommunications network. The networking component includes a server comprising a processor and an application programming interface executed by the processor. The application programming interface is configured to perform the operations of receiving a collaboration conference access request from a client application program associated with a client device associated with the telecommunications network, the collaboration conference access request received through a network interface unit of the server and configured to request access to a collaboration conference hosted by the telecommunications network, translating the received collaboration conference access request to one or more instructions specific to a hosting conferencing bridge selected from a plurality of conference bridges associated with the telecommunication's network, each of the plurality of conference bridges configured to host a collaboration conference, the selection occurring in response to the collaboration conference access request received from the client application program and transmitting the one or more instructions specific to the selected hosting conferencing bridge to the selected hosting conferencing bridge.

DETAILED DESCRIPTION

Figure 1:
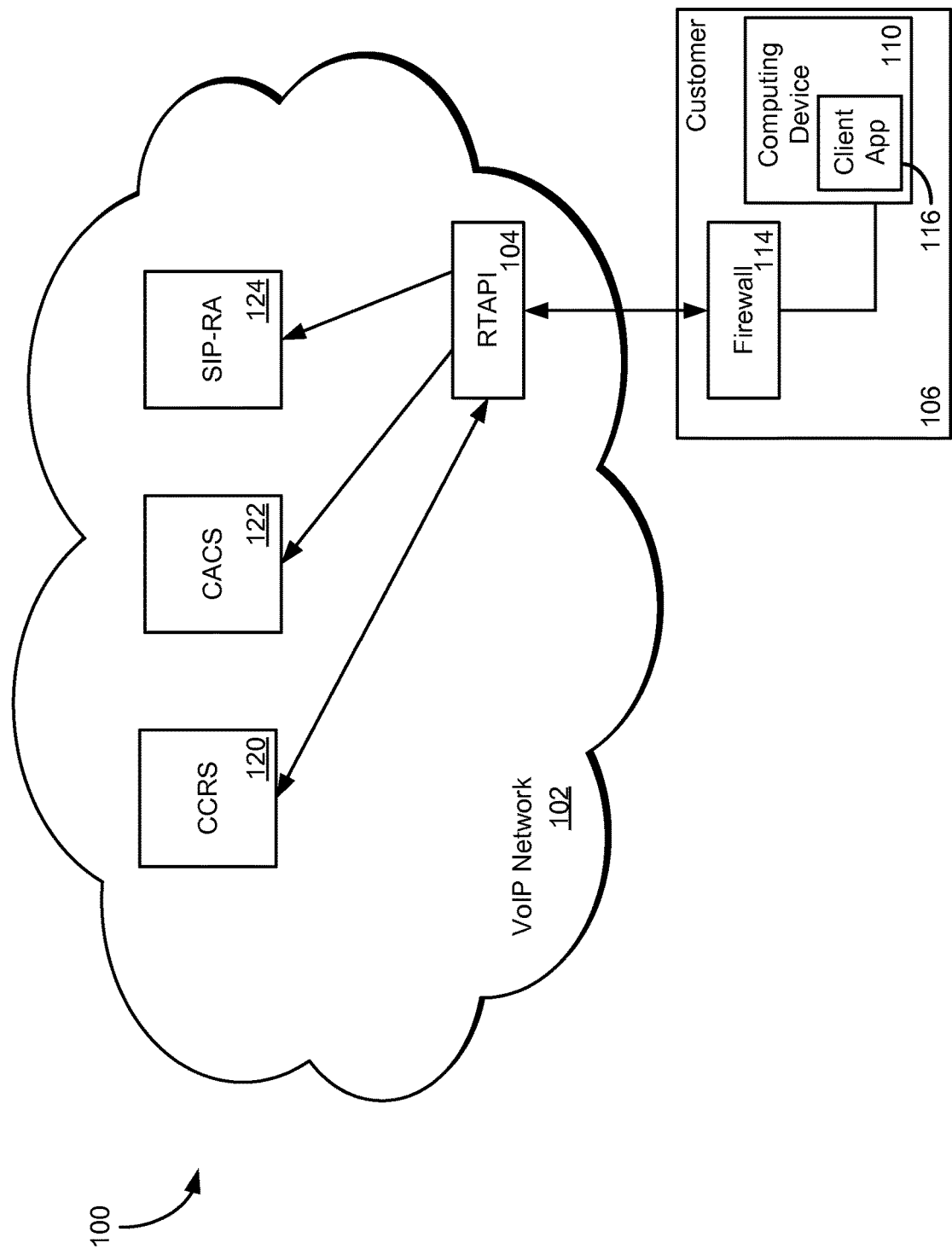
FIG. 1 schematic diagram illustrating an exemplary Voice over Internet Protocol (VoIP) operating environment in accordance with one embodiment.

Aspects of the present disclosure involve systems, methods, computer program products, and the like, for implementing a web conferencing service in a telecommunications network. One embodiment of the system and methods involve a real-time application programming interface (RTAPI) component in the telecommunications network. The RTAPI, in one embodiment, provides a platform through which one or more users or clients of the telecommunications network interfaces with one or more conferencing components of the network. In general, the RTAPI system allows a user to create a server-client relationship with a server of a telecommunication's network to provide commands or instructions to the network that are then translated into the proper command corresponding to the type of conferencing system and device associated with the user. For example, the RTAPI may provide an interface for one or more user devices to access a web component of a conferencing feature provided by the telecommunications network.

In general, the RTAPI provides a common interface through which clients can interact with services of a telecommunication network, such as a web conferencing system of the network. In particular, the RTAPI may be used to mask or hide the actual platforms located within the web conferencing system and may serve as a command interpreter between the clients and the various platforms. In some instances, the RTAPI may provide such functionality as client application authentication, subscription verification, conference bridge and conference state determination, dial-out, etc, among others. The RTAPI may also provide web conference related information, such as a roster of conference participants, active speaker, and the like.

Through the RTAPI system, the telecommunications network may also provide added functionality to web conferencing over the network, regardless of which conferencing system is being utilized by the network for the conference associated with the user. For example, the RTAPI can provide active speaker identification to the user's client application that indicates which participant in the conference is speaking or active at any time. By utilizing the RTAPI system to provide this feature, the conferencing system of the network is relieved from providing the information to each participant to the conference. In another embodiment, the RTAPI may reconcile multiple presences of a participant to the conference to provide a uniform identification within the collaboration conference. For example, the RTAPI component may recognize a dialed-in presence of a user to the conference as similar to a log-in presence of the same user. In this situation, the RTAPI can provide a single identification of the user to a web conferencing interface accessed by the user. Further, another embodiment of the RTAPI acts as a cache of conferencing information for the users of the web conference, bringing the conferencing information closer to the user's device. Finally, the RTAPI may be utilized to receive one or more preferences of a participant to a conference that allows the network to connect the participant to the conference at a scheduled time with little to no activity required by the participant.

FIG. 1 illustrates an exemplary operating environment 100 for implementing an RTAPI component in a telecommunications network that includes a conferencing feature. The environment 100 provides for setting up Voice over Internet Protocol (VoIP) communication sessions, including voice and web conferencing, between network users. With specific reference to FIG. 1, the environment 100 includes a VoIP network 102 provided by a wholesale network service provider. The VoIP network 102 includes numerous components such as, but not limited to, gateways routers which enable communication across the VoIP network 102, routers and/or servers to route communication packets through the network, and other telecommunication network components. However, for ease of understanding the present disclosure, these components are not shown or described in detail here as those skilled in the art will readily understand these components. Additional components include at least one RTAPI component and one or more conferencing devices, described in more detail below. Also relevant to this description is the interaction and communication between the VoIP network 102 and other entities, such as the one or more customer home or business local area networks (LANs) 106.

Customer network 106 can include communication devices such as, but not limited to, a personal computer, server, or other computing device 110 or a telephone connected to a router/firewall 114. Some examples of the end user communication device 110 include an IP-enabled telephone, cellular telephone, laptop computer, server, personal computer, fax machine and the like. The communication and networking components of the customer network 106 enable a user at the customer network 106 to communicate via the VoIP network 102 to other communication devices, such as another customer network and/or an analog telephone 120. Components of the customer network 106 are typically home- or business-based, but they can be relocated and may be designed for easy portability. For example, the telephone 110 may be wireless (e.g., cellular). Further, end user devices may include any type of computing devices configured to implement one or more aspects of a web conference, in tandem or separate from a voice conference feature. In one embodiment, the user device includes a real-time application programming client interface application 116 stored on and executable by the user device. The application may allow the user device to communicate with a related component within the telecommunications network 102.

In one embodiment, the network 102 includes a collaboration conferencing feature with voice conferencing and/or web conferencing. The conferencing network includes a real-time application programming interface (RTAPI) 104, one or more conference call routing servers (CCRS) 120, one or more IP based conference bridges 124 that may include, for example, one or more session initiation protocol ready access (SIP RA) application servers and media servers, and/or one or more TDM based conference bridges 122, that may include, for example, one or more conference allocation and control system (CACS), all of which provide an audio conference service that can be integrated to web conferencing, customer premise-based conferencing, and partner conferencing services to the user, among other services.

Figure 2:
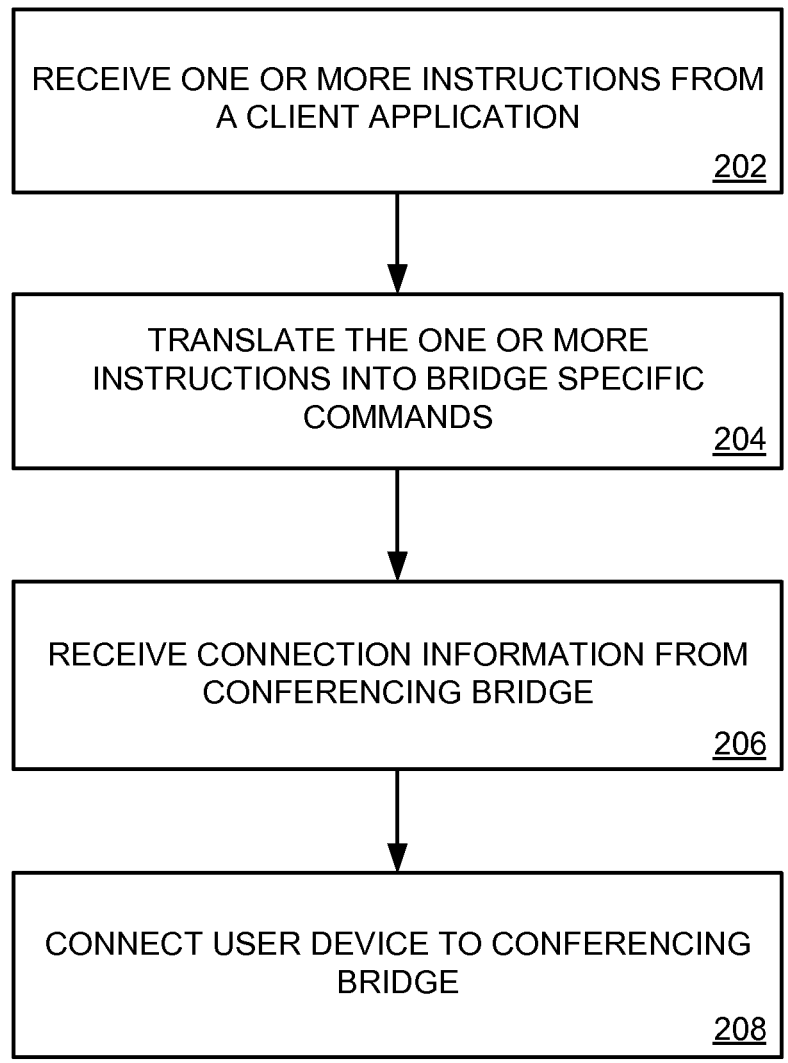
FIG. 2 is a flowchart illustrating one method for a real time application programming interface device to provide an interface between a user's device connected to a telecommunications network and a conferencing system within or associated with the network.

Through the use of the RTAPI system, device, or component described herein, several features related to conferencing may be provided to a user device associated with a telecommunications network. For example, FIG. 2 illustrates one method for the RTAPI to provide an interface between a user's device connected to a telecommunications network and a conferencing system within or associated with the network. Beginning in operation 202, the RTAPI receives one or more instructions from the user's device, through an RTAPI client application. In operation 204, the RTAPI translates the user's instructions into a format recognizable by a conferencing system of the network. For example, the client application may provide an instruction to start or end a web conference to which to the user is participating. The RTAPI may translate that command into the proper format for the type of conferencing system being utilized by the network for that user. This instruction may be received by the RTAPI device, translated into a proper instruction for the conferencing system the user's conference is conducted on and transmit the instruction onto the conferencing system to start or end the conference. Similar features that may be translated by the RTAPI component include, but are not limited to, adding and dropping a participant, muting a participant's line, locking or unlocking a conference, etc. Further, the RTAPI device provides several additional features for a web conference hosted by the network.

In operation 206, the RTAPI device receives connection information for the conference bridge associated with the user. In particular, the conference bridge may provide particular socket information to the RTAPI through which the user device may be connected to the conferencing bridge. In operation 208, the RTAPI may then connect the user device to the particular conferencing bridge using the connection information.

As understood through the method of FIG. 2, the RTAPI 104 provides an interface through which clients can interact with the web conferencing feature of the telecommunications network 102. In particular, the RTAPI 104 may be used to mask or hide the actual platforms located within the web conferencing system and may serve as command interpreter between the client 106 and the various platforms. For example, the RTAPI 104 may provide the interface through which a user device 106 connects to a TDM based conference bridge 122 or an IP-based conference bridge 124. In some instances, the RTAPI 104 may provide such functionality as client application authentication, subscription verification, conference bridge and conference state determination, dial-out, etc., among others. The RTAPI 104 may also provide web conference related information, such as a roster of conference participants, active speaker, etc. to one or more of the participants to a conference. For example, the RTAPI 104 may rely on a call routing application, such as CCRS 120, to determine bridge route information, such as the bridge through which a conference is occurring or is to occur. The RTAPI 104 may then establish a socket connection and a client application session to an appropriate platform based on the provided bridge route information. In particular, the RTAPI 104 may issue a dial-out request to either CACS 122 or a SIP RA 124 to perform the actual dial-out to the appropriate conference participant(s). These features related to conferencing within a telecommunications network is discussed in more detail below.

To determine bridge route information, the CCRS 120 may be configured to accept information from other systems and/or applications that may aid the CCRS in the determination process. In particular, the CCRS 120 may use a telephone number, an access number, an access code, and/or pin supplied, for example, to the RTAPI 104 through a user interface located on the client device 110. Additionally, the CCRS 120 may use traffic information received from the IP based conference bridge 124 or TDM based conference bridge 122 in order to determine the requested conference bridge information.

The CACS 122 and SIP RA servers 124 in general, serve as audio conferencing bridges and communicate with one or more network devices to establish the web conference. In particular, the CACS 122 and the SIP RA servers 124 provide the audio/voice mixing for the audio part of the web conference and coordinate audio/voice traffic. For example, some of the CACS 122 and SIP RA 124 functionality may include dialing out to any registered network customers and managing the flow of the audio signal between the customers. Depending on the type of the audio signal and/or the network on which the conference is carried, the audio portion of the conference may be conducted through either CACS 122 or SIP RA 124 conferencing platform. In particular, the CACS server 122, which is a time division multiplexing (TDM)/circuit-switched based audio conferencing platform, may be used to conduct audio portion of the web conference that is conducted utilizing TDM-based components of the network. The SIP RA server 124, on the other hand, provides a platform for conducting VoIP calls for IP-based networks.

As discussed above, several features available from a telecommunications network may be provided through the RTAPI device 104 of the network 102. For example, the RTAPI 104 may be configured to provide an identification of an active speaker to the participants of a conference. Previously, this information is provided by the conferencing system to each participant to the conference. However, because many different types of client devices 106 may connect to a particular conference, an information packet from the conferencing system to the user's device may not properly inform a client device who is the active speaker. The RTAPI 104, on the other hand, may receive the information from the conferencing system and translate the information into a format for each client application 116 and/or client device 106 connected to the RTAPI such that each interface for the web conference provided by the user's devices can determine who is the active speaker. In this manner, the RTAPI component 104 may relieve the conferencing system from providing this information to each participant individually, thereby reducing the traffic transmitted through the network. Instead, the conferencing system 120-124 may provide a single command to the RTAPI device 104, which in turn may create and transmit the user device specific command to each user interface of the conference.

In another example, the RTAPI component 104 of the conferencing system reconciles multiple presences of a participant in a conference to a web conference interface for the conference. For example, a participant may log into a web conference on one end user device 106, such as a computer, through a web conference interface. Additionally, the same participant may use another end user device, such as a telephone, to access the voice component of the conference. However, because the user has logged onto the web conference through the interface, the conferencing system may not recognize the user's telephone as related to the user's web presence. In this situation, the RTAPI 104 may recognize the user's telephone device as belonging to a user already logged into the web conference. If recognized, the RTAPI 104 may associate an identifier in the interfaces provided to the participant that links the user's web presence and the user's voice presence such that these presences are presented to the other participants as a single user. In this manner, the participants to the conference are presented a uniform interface that properly identifies each of the participants to the conference.

In yet another example, the RTAPI component 104 of the conferencing system may store one or more packets of information concerning a conference of the network. The information may be stored and provided to the participants of the conference or the conferencing system as determined by the RTAPI 104. Essentially, the RTAPI component 104 may act as a cache for information provided between the user devices 106 and the conferencing system 120-124. This caching feature may reduce the amount of traffic transmitted through the network, as well as provide the information to the components of the system faster as the data may be closer to the receiving devices. The caching feature of the RTAPI device 104 is discussed in more detail below with reference to FIG. 3.

In one particular implementation of the conferencing system, the devices of the conferencing system 120-124 may be configured to join a participant to the conference automatically at a particular time established by a user to the system. For example, a user may provide one or more instructions or preferences to the conferencing network that instructs the conferencing network to call the user or otherwise log the user into the conference at a specific time. This feature would remove the need for the participant to log into the conferencing system each time the user wishes to join a conference. In one embodiment of the network, the RTAPI component 104 may receive the user instructions and preferences from a client application on the user's device 106 and store said information at the RTAPI component. Then, when the designated time to join a conference is reached, the RTAPI 104 may begin the process of joining the participant to the conference. In one example, the RTAPI 104 may instruct the conferencing system to dial-out to the participant such that the participant merely answers the user's device and is joined into the conference. Because the RTAPI 104 is configured to receive and translate instructions from the user devices 106, the RTAPI may be tasked with initiating the process of joining the user to the conference.

The instructions or preferences provided by the user to the network may include any type of preference offered by the conferencing network. For example, the user's device 106 may instruct the conferencing system 120-124 to join the user's device with the conference at the designated time, but mute the user device until an unmute instruction is received. This preference is received and stored by the RTAPI 104, which configures the conferencing system 120-124 in accordance with the preferences at the designated time for the conference. Another example of a preference that is stored and processed by the RTAPI 104 include the number at which the participant can be reached and the type of user device 106 the user prefers to be contacted on when joining a conference. In general, the RTAPI 104 may receive, store and process any preference for a web conference that is offered by the conferencing network for a particular user of the network.

In this manner, the RTAPI device 104 of the telecommunications network 102 may be configured to provide any number of conferencing features to a user of the network. In particular, because the RTAPI device 104 acts as the interface between the participants of a conference and a particular conferencing system 120-124, the RTAPI 104 may be configured to provide or coordinate the various conferencing options provided by the network to various types of end user devices 106, regardless of the type of conferencing system utilized by the network for a particular conference.

Figure 3:
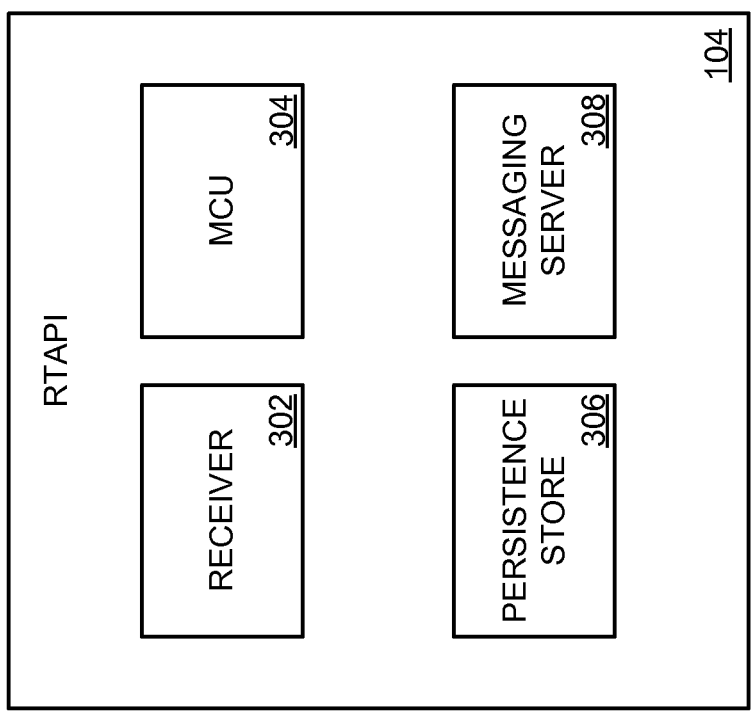
FIG. 3 is a schematic diagram illustrating an exemplary real time application programming interface device in a telecommunications network.

FIG. 3 is a schematic diagram illustrating an exemplary real time application programming interface (RTAPI) device in a telecommunications network. The RTAPI 104 illustrated in FIG. 3 is one example of an RTAPI-type device for a telecommunications network. For example, the RTAPI 104 of FIG. 3 may be the RTAPI illustrated in FIG. 1 and discussed in more detail above. In general, any type of computing device that provides a real-time application programming interface for a user of a telecommunications network is envisioned as performing one or more of the methods or systems described herein.

As shown, the RTAPI 104 may include one or more modules configured to perform one or more functions of the RTAPI device. The particular embodiment of the RTAPI 104 illustrated in FIG. 3 includes a receiver 302 module configured to receive one or more messages from one or more components of the telecommunications network 102 and the customer's device 110, such as through a RTAPI client application. The RTAPI 104 may also include a multipoint control unit (MCU) 304 configured to control the operation of the RTAPI device. One example of an MCU 304 is described in more detail below with reference to the one or more processors of a computing device of FIG. 4.

In addition, the RTAPI 104 may maintain one or more databases to store information and aid in the operation of the RTAPI device. For example, the RTAPI 104 of FIG. 3 includes a persistence store database 306 to store one or more computer-readable instructions for the operation of the RTAPI. In one example, the persistence store 306 is a MySQL-type database. The persistence store 306 may be utilized by the RTAPI component 104 to store user instructions and preferences, as discussed above. Also, the RTAPI 104 may include a messaging server 308 to store one or more messages transmitted between the user device 110 and the network 102 during the operation of the conferencing feature of the network. As should be appreciated, the modules illustrated in FIG. 3 and discussed herein are but a few examples of the functional modules of the RTAPI device 104 to offer the functionalities of the conferencing network discussed herein.

Figure 4:
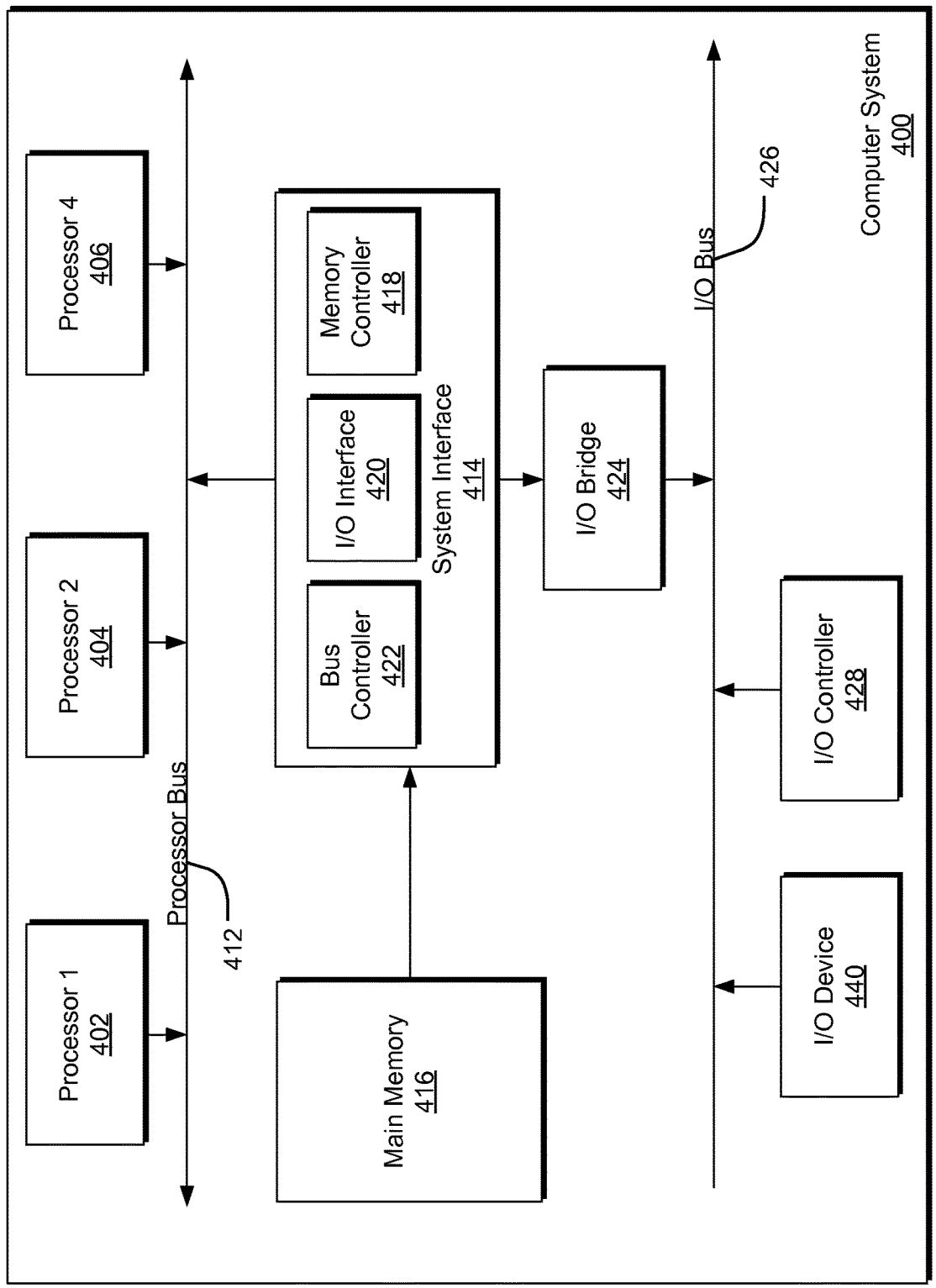
FIG. 4 is a diagram illustrating an example of a computing system which may be used in implementing embodiments of the present disclosure.

FIG. 4 is a block diagram illustrating an example of a computing device or computer system 400 which may be used in implementing the embodiments of the components of the network disclosed above. For example, the computing system 400 of FIG. 4 may be used to implement the various components of the RTAPI device 104 discussed above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 414 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 440, as illustrated.

I/O device 440 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for facilitating a collaboration conference in a telecommunications network, the method comprising:
   receiving a collaboration conference access request from a client application program executed on a client device at an application programming interface of a server associated with the telecommunications network;
   selecting a hosting conference bridge from a plurality of conference bridges associated with the telecommunications network and configured to host a collaboration conference, the selection occurring in response to the collaboration conference access request;
   translating the received collaboration conference access request to one or more instructions specific to the selected hosting conferencing bridge; and
   transmitting the one or more instructions specific to the selected hosting conferencing bridge to the selected hosting conferencing bridge, wherein the one or more instructions specific to the selected hosting conferencing bridge include an indication of the collaboration conference access request from the client application program.

2. The method of claim 1 further comprising:
   receiving connection information at the application programming interface of the server from the selected hosting conferencing bridge configured to connect the client device to the collaboration conference hosted by the selected hosting conferencing bridge.

3. The method of claim 2 further comprising:
   connecting the requester's device to the collaboration conference of the selected hosting conferencing bridge based on the received connection information and utilizing the telecommunications network.

4. The method of claim 3 further comprising:
   receiving one or more collaboration conferencing instructions from the client application program, the one or more collaboration conferencing instructions configured to initiate a feature of the collaboration conference;
   translating the received one or more collaboration conferencing instructions to one or more feature initiating instructions specific to the selected hosting conferencing bridge; and
   transmitting the one or more collaboration conferencing instructions to the selected hosting conferencing bridge.

5. The method of claim 4 wherein the feature of the collaboration conference is at least one of adding a participant to the collaboration conference, dropping a participant from the collaboration conference, muting a participant or locking a collaboration conference.

6. The method of claim 4 wherein the collaboration conference access request includes a web-based conference component and the one or more collaboration conferencing instructions are configured to initiate a web-based conferencing feature.

7. The method of claim 6 wherein web-based conferencing feature is a roster configured to indicate the participants to the collaboration conference on at least one user interface display.

8. The method of claim 7 wherein the web-based conferencing feature is an active speaker indicator configured to indicate an active speaker on the at least one user interface display.

9. The method of claim 7 wherein the web-based conferencing feature is a roster reconciliation configured to associate an identifier to an audio component and the web-based conference component of a participant to the collaboration conference in the at least one user interface display.

10. A system for hosting a collaboration conference in a telecommunications network, the system comprising:
   a network interface configured to receive a communication from a user of a communications network to establish a collaboration conference on the network;
   a processing device in communication with the network interface unit; and
   a computer-readable medium connected to the processing device configured to store information and instructions that, when executed by the processing device, instantiates an application programming interface that performs the operations of:
      receiving a collaboration conference access request from a client application program associated with the user;
      selecting a hosting conference bridge from a plurality of conference bridges associated with the network and configured to host a collaboration conference, the selection occurring in response to the collaboration conference access request received from the client application program associated with the user;
      translating the received collaboration conference access request to one or more instructions specific to the selected hosting conferencing bridge; and
      transmitting the one or more instructions specific to the selected hosting conferencing bridge to the selected hosting conferencing bridge.

11. The system of claim 10 wherein the computer-readable medium is further configured to store one or more collaboration conferencing preferences of the user.

12. The system of claim 10 wherein the application programming interface further performs the operations of:
   receiving connection information from the selected hosting conferencing bridge configured to connect a device associated with the user to the collaboration conference hosted by the selected hosting conferencing bridge; and
   connecting the device associated with the user to the collaboration conference of the selected hosting conferencing bridge based at least on the received connection information.

13. The system of claim 12 wherein the application programming interface further performs the operations of:
   receiving one or more collaboration conferencing instructions from the client application program associated with the user, the one or more collaboration conferencing instructions configured to initiate a feature of the collaboration conference;
   translating the received one or more collaboration conferencing instructions to one or more feature initiating instructions specific to the selected hosting conferencing bridge; and
   transmitting the one or more collaboration conferencing instructions to the selected hosting conferencing bridge.

14. The system of claim 13 wherein the collaboration conference access request includes a web-based conference component and the one or more collaboration conferencing instructions are configured to initiate a web-based conferencing feature.

15. The system of claim 14 wherein web-based conferencing feature is a roster configured to indicate the participants to the collaboration conference on at least one user interface display.

16. The system of claim 15 wherein the web-based conferencing feature is an active speaker indicator configured to indicate an active speaker on the at least one user interface display.

17. The system of claim 15 wherein the web-based conferencing feature is a roster reconciliation configured to associate an identifier to an audio component and the web-based conference component of a participant to the collaboration conference in the at least one user interface display.

18. A networking component of a telecommunications network comprising:
   a server comprising:
      a processor; and
      an application programming interface executed by the processor, application programming interface configured to perform the operations of:
         receiving a collaboration conference access request from a client application program associated with a client device associated with the telecommunications network, the collaboration conference access request received through a network interface unit of the server and configured to request access to a collaboration conference hosted by the telecommunications network;
         translating the received collaboration conference access request to one or more instructions specific to a hosting conferencing bridge selected from a plurality of conference bridges associated with the telecommunication's network, each of the plurality of conference bridges configured to host a collaboration conference, the selection occurring in response to the collaboration conference access request received from the client application program; and
         transmitting the one or more instructions specific to the selected hosting conferencing bridge to the selected hosting conferencing bridge.

19. The networking component of claim 18 wherein the selected hosting conferencing bridge is a time division multiplexing telecommunication device.

20. The networking component of claim 18 wherein the selected hosting conferencing bridge is a session initiation protocol based telecommunication device.

* * * * *